UNITED STATES PATENT OFFICE.

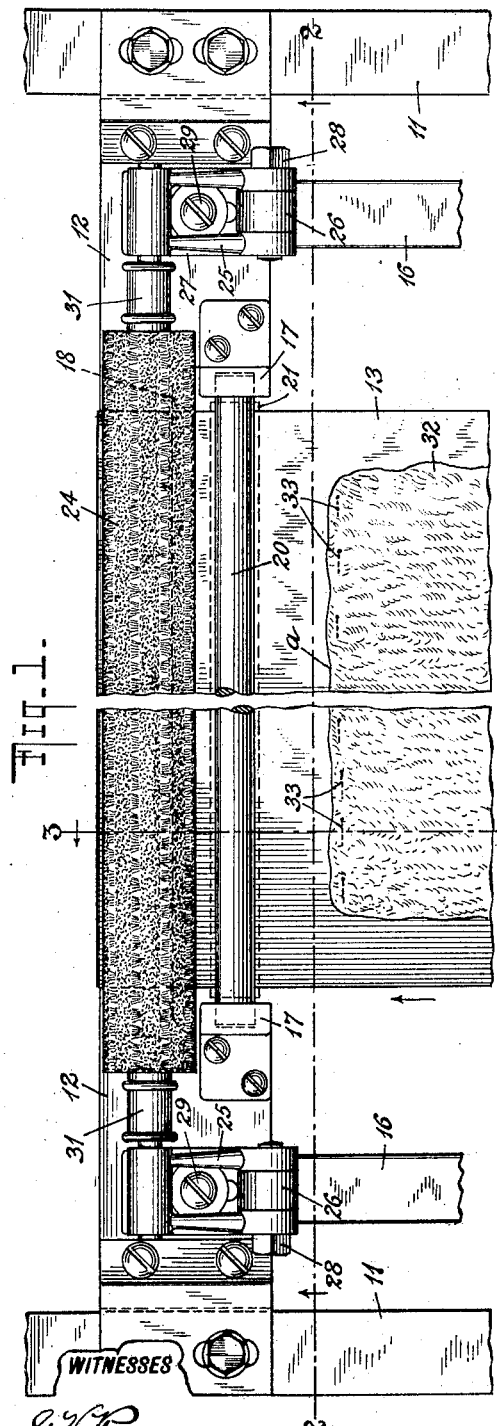
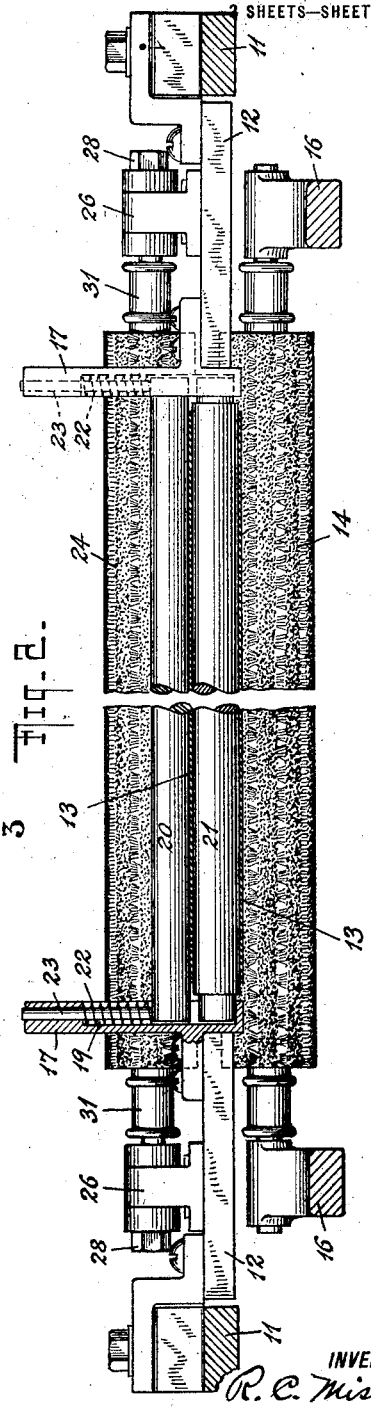

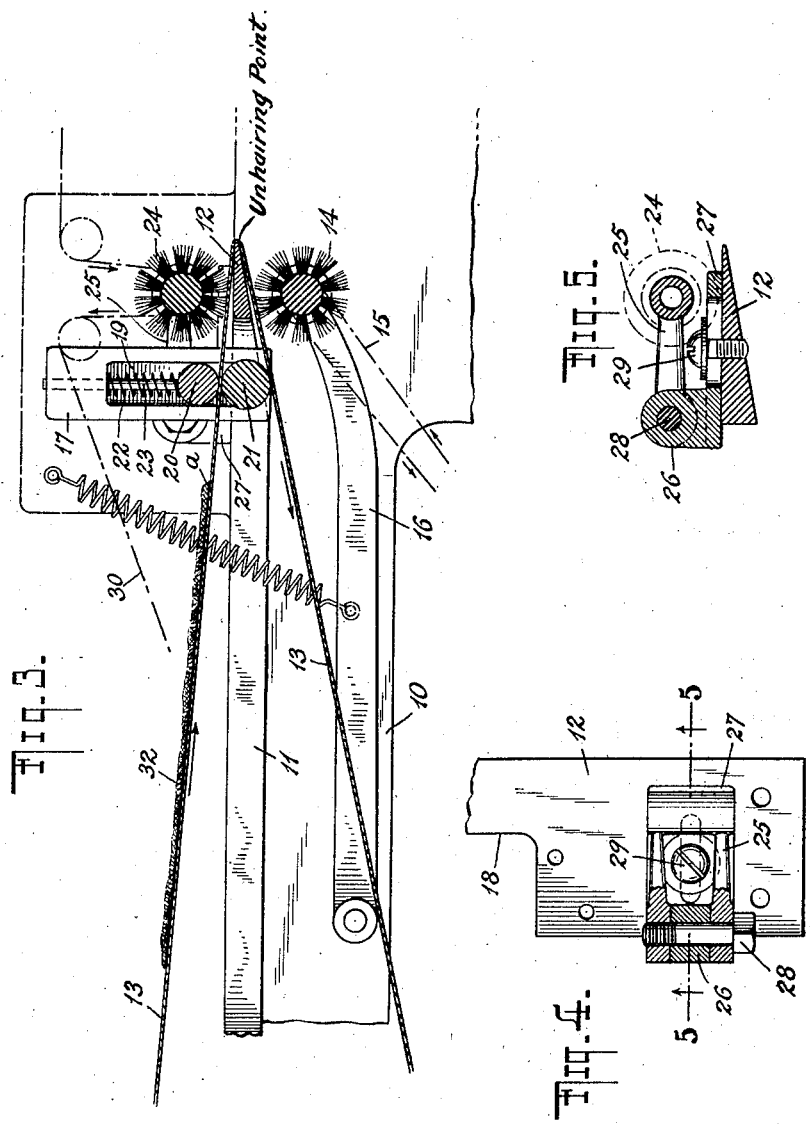

REINHARDT CHARLES MISCHKE, OF NEW YORK, N. Y.

UNHAIRING-MACHINE.

1,393,809.  Specification of Letters Patent.  Patented Oct. 18, 1921.

Application filed May 26, 1920. Serial No. 384,334.

*To all whom it may concern:*

Be it known that I, REINHARDT CHARLES MISCHKE, a citizen of the United States, and resident of the borough of Brooklyn, county of Kings, city and State of New York, have invented certain new and useful Improvements in Unhairing-Machines, of which the following is a specification.

My invention relates to machines for unhairing pelts or, in other words, for removing the stiff or water hairs from the skins of fur bearing animals whereby the quality of the fur and its value from a commercial standpoint is increased. Such machines generally speaking, include an endless apron which carry the pelts and upon which said pelts are temporarily fastened by means of pins. As it is necessary with existing constructions, in order to secure the desired operation, to fasten these pelts securely throughout their entire peripheries, the pinning operation consumes considerable time and requires the use of a considerable number of pins. The object of my invention is to provide a simple construction whereby the operation of securing the pelts upon the apron is reduced to its simplest form and whereby the efficiency of the unhairing operation is increased. My invention will be fully described hereinafter and the features of novelty will be pointed out in the appended claim.

In the accompanying drawings, which for illustrative and descriptive purposes and without intent to define the limits of the invention, show an example thereof, Figure 1 is a fragmentary plan view; Fig. 2 is a section on the line 2—2 of Fig. 1; Fig. 3 is a cross-section on the line 3—3 of Fig. 1; Fig. 4 is a detail plan view; Fig. 5 is a detail section on the line 5—5 of Fig. 4.

For the purpose of explaining the invention and its operation, it is shown as installed, in an unhairing machine of the kind disclosed in Patent No. 655,031 of July 31, 1900, to John W. Sutton; it will be understood that the improvement is equally well adapted for operative combination with other forms of unhairing machines.

As shown in the drawings, the machine comprises the usual frame 10 on which a carriage 11 carrying the stretcher-bar 12 is reciprocated in the customary manner. The machine includes further the usual endless pelt carrying apron 13 which passes over the stretcher-bar 12 and over suitable rollers mounted upon the carriage 11 and driven in the well known way by gearing in the customary manner as shown in the patent referred to.

A brush 14 may also form part of the construction and may be driven by an endless belt 15 and as shown, is mounted upon pivoted arms 16, operated by a suitable cam to move the brush 15 away from the stretcher-bar 12 at each forward reciprocation of the carriage 11. The machine also includes the customary cutting knife operated in the well known way and coöperating with the usual reciprocating knife to cut the stiff or water hairs from the pelt at the proper time in the operation of the machine, these parts having been omitted from the drawings, as they form no part of the present invention. As so far described, the machine may be of any well known construction and may include all features generally found in machines of the kind in question; for details in the operation and construction of the machine chosen for illustrative purposes reference may be had to the patent mentioned above.

My invention, in its illustrated form, comprises bearings 17 located in alinement with each other and secured to and extending upwardly from the stretcher-bar 12 which is cut out as indicated at 18 for the accommodation of said bearings as shown in Figs. 1 and 2. The bearings 17 are provided with slots 19 in which rollers 20 and 21 are journaled, springs 22 being interposed between the roller 20 and the upper ends of said slots 19 to yieldingly support said rollers as shown in Fig. 3; rods 23 extend within the springs 22 to maintain them in the slots against unintentional displacement.

The arrangement further includes a rotary brush 24 located above the stretcher-bar 12 and journaled in arms 25 pivoted upon lugs 26 projecting upwardly from slotted members 27, bolts 28 being provided for fixing said arms against pivotal movement to maintain said brush 24 in an adjusted position. The slotted members 27 lie in surface engagement with the stretcher-bar 12 and are adjustable relatively thereto to vary the position of the brush 24, any suitable means, as for instance, screws 29 being provided for securing said members 27 and consequently the brush 24 in an adjusted position. The latter may be rotatably driven in any suitable manner as for instance, by means of a belt 30 and belt pulleys 31. By referring to Fig. 3 it will be seen that the pelt carrying apron 13 passes between said rollers 20 and 21 before it reaches the edge of the stretcher-bar 12 about which it makes a turn.

With this arrangement the pelt 32 is attached to the apron 13 by means of pins 33 or the like, the attachment however being only along its forward edge $a$ or in other words along the edge which lies in the direction of travel of the upper run of the apron 13 as shown in Fig. 3, the remainder of the pelt being disconnected and free from said apron. As the apron 13 advances, in the operation of the machine, the pelt 32 will finally pass between the rollers 20 and 21 which by the action of gravity and of the springs 22 exert a pressure upon said pelt which is sufficient to stretch it taut and flat upon the apron as said pelt passes about the sharp edge of the stretcher-bar 12. In other words the action of the rollers maintains the pelt in the same position, during the actual operation of removing the stiff hairs, as it would be if fastened throughout its entire periphery to the apron and in addition rolls out said pelt and prevents the formation of folds, or wrinkles therein at the critical point in the unhairing operation.

The rollers 20 and 21 being located in relatively close proximity to the active edge of the stretcher-bar 12 will act upon each pelt in such a way as to permit complete unhairing thereof.

Because of the fact that the pelt need be secured to the apron only along one edge, successive pelts may be quickly attached to said apron while the machine is in operation and the speed of operation may be as a result, increased without in any way interfering with the efficiency of the machine as an unhairing apparatus. The saving in pins or equivalent fastening devices is also very great and waste thereof is reduced to a minimum thus decreasing the cost of operation and maintenance.

The device is simple and automatic in operation and relatively cheap to produce and may readily be installed in existing machines without requiring any material changes therein.

Various changes in the specific form shown and described may be made within the scope of the claim without departing from the spirit of my invention.

I claim:

In an unhairing machine, the combination of a stretcher bar, an apron passing over the same, means for securing a pelt along its one edge to said apron, slotted bearings located in operative relation to said stretcher bar, pressure rollers journaled in said slotted bearings and between which said pelt is carried by said apron and whereby said pelt is held taut upon said apron during the unhairing operation and springs in said slots whereby one of said rollers is pressed toward the other.

In testimony whereof I have hereunto set my hand.

REINHARDT CHARLES MISCHKE.